Patented Jan. 19, 1937

2,068,453

UNITED STATES PATENT OFFICE 2,068,453

ASCORBIC ACIDS AND METHODS OF MAKING SAME

Burckhardt Helferich, Leipzig, and Otto Peters, Oker, Germany

No Drawing. Application July 9, 1935, Serial No. 30,562. In Germany July 28, 1934

17 Claims. (Cl. 260—123)

The present invention relates to ascorbic acids and methods of making same.

The ascorbic acids have the following typical configuration:

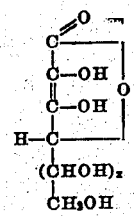

wherein $x$ may stand for 0 or a low whole number. In this formula the special arrangement of the H-atoms and OH-groups in relation to the axis of the C-atoms has not been taken into account. These compounds have throughout a strong reducing action. Besides, a great number of them possess a surprising therapeutical and physiological efficacy. The best known of them is the levo-ascorbic acid, known as vitamin C, of the following formula:

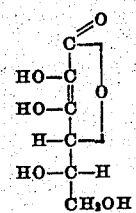

Now we have found a new method for preparing these ascorbic acids in a simple manner. The new process is based on the observation that the atomic grouping:

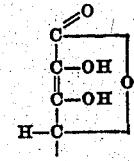

characteristic of the said acids is formed by causing a glyoxylic acid ester, for instance, glyoxylic acid ethyl ester, to act upon an aldo-sugar in an alkaline medium, for instance in aqueous or alcoholic solution. For producing the alkaline reaction alkali metal cyanides, such as sodium cyanide, are particularly suitable. It is advisable to carry out the reaction with exclusion of air in an inert gas, for instance, in a nitrogen atmosphere, and to heat the solution of the reaction components to boiling.

It may be supposed that the reaction proceeds according to the following scheme in which I is the terminal atomic group of the aldo-sugar and II is the formula of the glyoxylic acid ester:

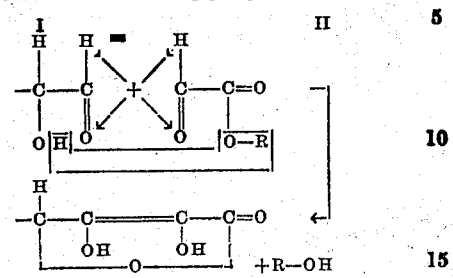

According to this scheme the condensation occurs with formation of the configuration typical for the ascorbic acid, the ester group being split off.

For carrying out the reaction aldo-sugars of all kinds are suitable. By starting, for instance, from the dextro-glucose of the formula:

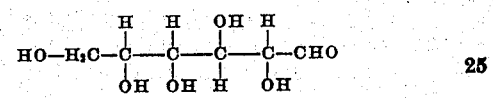

a hitherto unknown dextro-glucohepto-ascorbic acid of the formula:

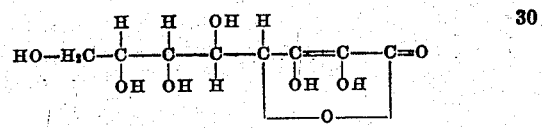

is obtained which is derived from the glucoheptose.

When dextro-threose of the formula:

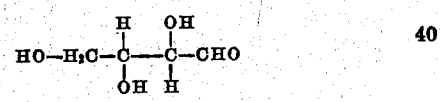

is used there is obtained the dextro-ascorbic acid of the formula:

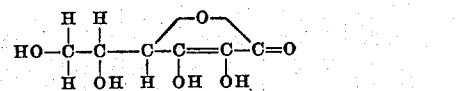

When laevo-threose of the formula:

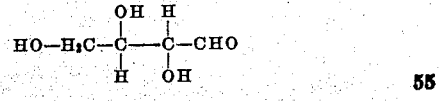

is used there is obtained the laevo-ascorbic acid (vitamin C) of the formula:

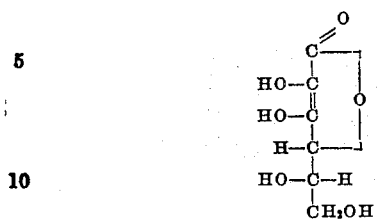

Instead of the free aldo-sugars there may also be used derivatives which form these free sugars in an alkaline medium. We have, for instance, found that aldonic acid nitriles or acetylated aldonic acid nitriles, which by the action of alkali are transformed into aldo-sugars with elimination of hydrocyanic acid and saponification of the acetyl groups (cf. G. Zemplen and Kiss, "Berichte der deutschen Chemischen Gesellschaft", volume 60, page 165 (1927)), may simultaneously be condensed in one operation with glyoxylic acid esters. The following formulae illustrate this reaction for obtaining the dextro-ascorbic acid from tetracetyl-dextro-xylonic acid nitrile:

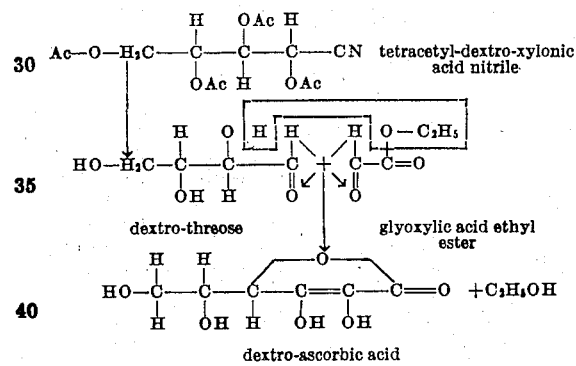

In the same manner the optical antipode of the tetracetyl-dextro-xylonic acid nitrile, the laevo-compound, consequently leads to the laevo-ascorbic acid.

By the new reaction all the ascorbic acids obtainable from the different aldo-sugars may be produced.

The following examples serve to illustrate the invention, but they are not intended to limit it thereto, the parts are by weight unless otherwise stated.

(1) *Dextro-glucohepto-ascorbic acid*

To a mixture heated on a water bath of 6 parts of dextro-glucose in 20 parts of water and 10 parts of glyoxylic acid ethyl ester in 40 parts of methanol there are added through one jet 6 parts of sodium cyanide in 20 parts of water and 40 parts of methanol; the mixture is boiled for 10 minutes in a reflux apparatus and in a nitrogen atmosphere. After cooling to room temperature the solution is made feebly acid to litmus with a solution of 7 parts of glacial acetic acid in 14 parts of methanol; the methanol is expelled for the greater part under reduced pressure. The remaining solution is diluted with 80 parts of water and mixed with a solution of 12 parts of lead acetate in 120 parts of water. At 0° C. an almost colorless lead precipitate gradually separates, which is centrifuged, suspended in water and decomposed with hydrogen sulfide. After evaporation of the filtrate under reduced pressure there remains a yellow-brown sirup, 0.7 part in all, which when stored for a prolonged time over calcium chloride becomes solid and crumbly, but remains hygroscopic. The first mentioned lead precipitate yields on decomposition with hydrogen sulfide a product which contains more ascorbic acid than the portions of the lead precipitate obtained later. The rotation of the substance obtained from the first portions of the lead precipitate is $$(\alpha)D^{20} = +4.4°;$$

0.0133 gram of substance decolorizes about 90 cc. of N/1000-indophenol solution. The substance slowly reduces Fehling's solution at room temperature. According to the reduction tests about 25% of the total quantity of the substance consists of dextro-glucohepto-ascorbic acid.

(2) *Dextro-ascorbic acid*

1 mol. of tetracetyl-dextro-xylonic acid nitrile is suspended in 6 to 7 parts by volume of absolute methanol and 3 mols of glyoxylic acid ethyl ester are added; the solution which is now clear is mixed at room temperature in a nitrogen atmosphere with a solution of somewhat more than 4 gram-atoms of sodium (4.3–4.4) in 30 parts by volume of absolute methanol. The yellow solution is then heated to boiling, kept at boiling temperature for 2 to 5 minutes, again cooled to room temperature in the course of about 25 minutes and then filtered.

The solution is feebly acidified with a solution of hydrogen chloride in methanol. The contents of ascorbic acid may be determined by an iodine titration of a test sample.

The product may be isolated by evaporation (the hydrocyanic acid obtained from the nitrile during the reaction likewise escaping), extraction of the residue with absolute ethyl alcohol (sodium chloride remaining), precipitation with alcoholic lead acetate, decomposition of the precipitate with hydrogen sulfide and evaporation of the aqueous solution. All operations should, if possible, be carried out in an atmosphere of nitrogen.

The honey-yellow residue crystallizes slowly; it crystallizes more quickly on addition of a few crystals thereof. The yield which somewhat varies amounts at least to one third mol. The dextro-ascorbic acid thus produced shows the known properties. It melts at a temperature between 183° C. and 185° C. The rotation in methanol is $$(\alpha)D^{20} = -40.2°.$$

0.0122 gram of the substance cosumes 13.2 cc. of N/100-iodine solution in acid solution. 0.006 gram of the substance decolorizes about 60 cc. of N/1000-indophenol solution. The substance reduces Fehling's solution at room temperature.

(3) *Laevo-ascorbic acid (vitamin C)*

1 mol. of laevo-xylonic acid nitrile is suspended in 6 to 7 parts by volume of absolute methanol; 3 mols of glyoxylic acid ethyl ester are added; the solution which is now clear is mixed at room temperature in a nitrogen atmosphere with a solution of somewhat more than 4 gram-atoms of sodium (4.3–4.4) in 30 parts by volume of absolute methanol. The yellow solution is then heated to boiling, kept at boiling temperature for 2 to 5 minutes, again cooled to room temperature in the course of about 25 minutes and then filtered.

The solution is feebly acidified with a solution of hydrogen chloride in methanol. The contents of ascorbic acid may be determined by an iodine titration of a test sample.

The product may be isolated by evaporation (the hydrocyanic acid obtained from the nitrile during the reaction likewise escaping), extraction of the residue with absolute ethyl alcohol (sodium chloride remaining), precipitation with alcoholic lead acetate, decomposition of the precipitate with hydrogen sulfide and evaporation of the aqueous solution. All operations should, if possible, be carried out in an atmosphere of nitrogen.

The honey-yellow residue crystallizes slowly; it crystallizes more rapidly on addition of a few crystals thereof. The yield which somewhat varies mounts to at least one third mol. The laevo-ascorbic acid thus produced is identical with the natural vitamin C.

We claim:

1. The process of preparing ascorbic acids which comprises causing a glyoxylic acid ester to act upon an aldo-sugar in an alkaline medium.

2. The process of preparing ascorbic acids which comprises causing a glyoxylic acid ester to act upon an aldo-sugar in the presence of an alkali metal cyanide.

3. The process of preparing an ascorbic acid which comprises causing a glyoxylic acid ester to act upon glucose in an alkaline medium.

4. The process of preparing an ascorbic acid which comprises causing a glyoxylic acid ester to act upon threose in an alkaline medium.

5. The process of preparing ascorbic acids which comprises causing a glyoxylic acid ester to act in an alkaline medium upon a compound which in an alkaline medium is transformed into an aldo-sugar.

6. The process of preparing ascorbic acids which comprises causing a glyoxylic acid ester to act upon an aldonic acid nitrile in an alkaline medium.

7. The process of preparing ascorbic acids which comprises causing a glyoxylic acid ester to act upon an aldonic acid nitrile in an alcoholic solution of alkaline reaction.

8. The process of preparing ascorbic acids which comprises causing a glyoxylic acid ester to act upon an aldonic acid nitrile in an alcoholic solution of alkaline reaction in a nitrogen atmosphere.

9. The process of preparing ascorbic acids which comprises causing a glyoxylic acid ester to act upon an aldonic acid nitrile in an alcoholic solution of alkaline reaction in a nitrogen atmosphere and heating the solution to boiling.

10. The process of preparing an ascorbic acid which comprises causing a glyoxylic acid ester to act upon dextro-xylonic acid nitrile in an alcoholic solution of alkaline reaction.

11. The process of preparing an ascorbic acid which comprises causing a glyoxylic acid ester to act upon dextro-xylonic acid nitrile in an alcoholic solution of alkaline reaction in a nitrogen atmosphere.

12. The process of preparing an ascorbic acid which comprises causing a glyoxylic acid ester to act upon dextro-xylonic acid nitrile in an alcoholic solution of alkaline reaction in a nitrogen atmosphere and heating the solution to boiling.

13. The process of preparing an ascorbic acid which comprises causing 3 molecular proportions of glyoxylic acid ethyl ester to act upon 1 molecular proportion of tetracetyl-dextro-xylonic acid nitrile in an alcoholic solution in the presence of sodium in a nitrogen atmosphere and heating the solution to boiling.

14. The process of preparing an ascorbic acid which comprises causing a glyoxylic acid ester to act upon laevo-xylonic acid nitrile in an alcoholic solution of alkaline reaction.

15. The process of preparing an ascorbic acid which comprises causing a glyoxylic acid ester to act upon laevo-xylonic acid nitrile in an alcoholic solution of alkaline reaction in a nitrogen atmosphere.

16. The process of preparing an ascorbic acid which comprises causing a glyoxylic acid ester to act upon laevo-xylonic acid nitrile in an alcoholic solution of alkaline reaction in a nitrogen atmosphere and heating the solution to boiling.

17. The process of preparing an ascorbic acid which comprises causing 3 molecular proportions of glyoxylic acid ethyl ester to act upon 1 molecular proportion of tetracetyl-laevo-xylonic acid nitrile in an alcoholic solution in the presence of sodium in a nitrogen atmosphere and heating the solution to boiling.

BURCKHARDT HELFERICH.
OTTO PETERS.